United States Patent [19]
Miyahara

[11] Patent Number: 5,504,814
[45] Date of Patent: Apr. 2, 1996

[54] EFFICIENT SECURITY KERNEL FOR THE 80960 EXTENDED ARCHITECTURE

[75] Inventor: Gary K. Miyahara, Rancho Palos Verdes, Calif.

[73] Assignee: Hughes Aircraft Company, Los Angeles, Calif.

[21] Appl. No.: 185,728

[22] Filed: Jan. 24, 1994

Related U.S. Application Data

[63] Continuation of Ser. No. 934,281, Aug. 24, 1992, abandoned, which is a continuation of Ser. No. 727,674, Jul. 10, 1991, abandoned.

[51] Int. Cl.$^6$ .................................................. H04L 9/00
[52] U.S. Cl. .................................................. 380/4; 380/25
[58] Field of Search .................................. 380/25, 49, 4; 395/425

[56] References Cited

U.S. PATENT DOCUMENTS

| | | | |
|---|---|---|---|
| 4,104,721 | 8/1978 | Markstein et al. | 364/200 |
| 4,713,753 | 12/1987 | Boebert et al. | 380/25 |
| 4,731,734 | 3/1988 | Gruner et al. | 395/425 |
| 4,962,533 | 10/1990 | Krueger et al. | 380/25 |
| 4,984,272 | 1/1991 | McIlroy et al. | 380/25 |
| 4,993,068 | 2/1991 | Pionsenka et al. | 380/23 |
| 5,018,096 | 5/1991 | Aoyama | 380/25 |
| 5,029,206 | 7/1991 | Marino, Jr. et al. | 380/4 |
| 5,057,996 | 10/1991 | Cutler et al. | 364/200 |
| 5,113,442 | 5/1992 | Moir | 380/25 |
| 5,276,735 | 1/1994 | Boebert et al. | 380/25 |

OTHER PUBLICATIONS

"Computer Security Technology Planning Study", J. P. Anderson, ESD–TR–73–51, vol. 1, AD–758 206, ESD/AFSC, Hanscom AFB, Bedford, Mass, Oct. 1972.

*Building a Secure Computer System*, M. Gasser, Van Nostrand Reinhold Company, New York 1988, pp. 26–37, 59, 107–108, and 201.

"Secure Computer Systems: Unified Exposition and Multics Interpretation", D. E. Bell et al., MTR–2997, The MITRE Corp. Bedford, MA, Mar. 1976.

"On the Inability of an Unmodified Capability Machine to Enforce the *–Property", W. E. Boebert, Proceedings of the Seventh DoD/NBS Computer Security Conference, Gaithersburg, MD 1984.

"The Role of 'System Build' in Trusted Embedded Systems", J. P. Alstad, et al., Proceeding of the 13th National Computer Security Conference, Washington, D.C., Oct. 1990.

"Department of Defense Trusted Computer System Evaluation Criteria", DOD 5200.28.STD, Dec. 1985.

"i960 ™ Programmer's Reference Manual", Intel Corporation, 1991.

*Primary Examiner*—Salvatore Cangialosi
*Attorney, Agent, or Firm*—Leonard A. Alkov; W. K. Denson-Low

[57] ABSTRACT

A computer security mechanism including an access control table specifying the predetermined access rights of each of a plurality of predetermined security subjects relative to predetermined security objects; a collection of mutually exclusive execution domains for each of the security subjects so that the executing processes of a security subject can only directly access code and data contained within the collection of domains of such security subject; a collection of mutually exclusive domains for a plurality of security object type managers, each of which is the sole owner of the right and ability to create and control access to security objects of a predetermined type, such that the only interaction between the execution environment of a security subject and the execution environment of another security subject is through operations on security objects performed through the services of the type managers; an object table for storing entries identifying the nature and location of security objects; and unforgeable access descriptors created by the security type managers by reference to the access control table for validation of access rights and utilized to allow access by security subjects to security objects via the object table, each access descriptor containing an index to the object table entry for the associated security object and identification of the access rights of the security subject with which the access descriptor is associated, whereby use of an access descriptor allows for efficient validation and mechanization of a requested access.

2 Claims, 9 Drawing Sheets

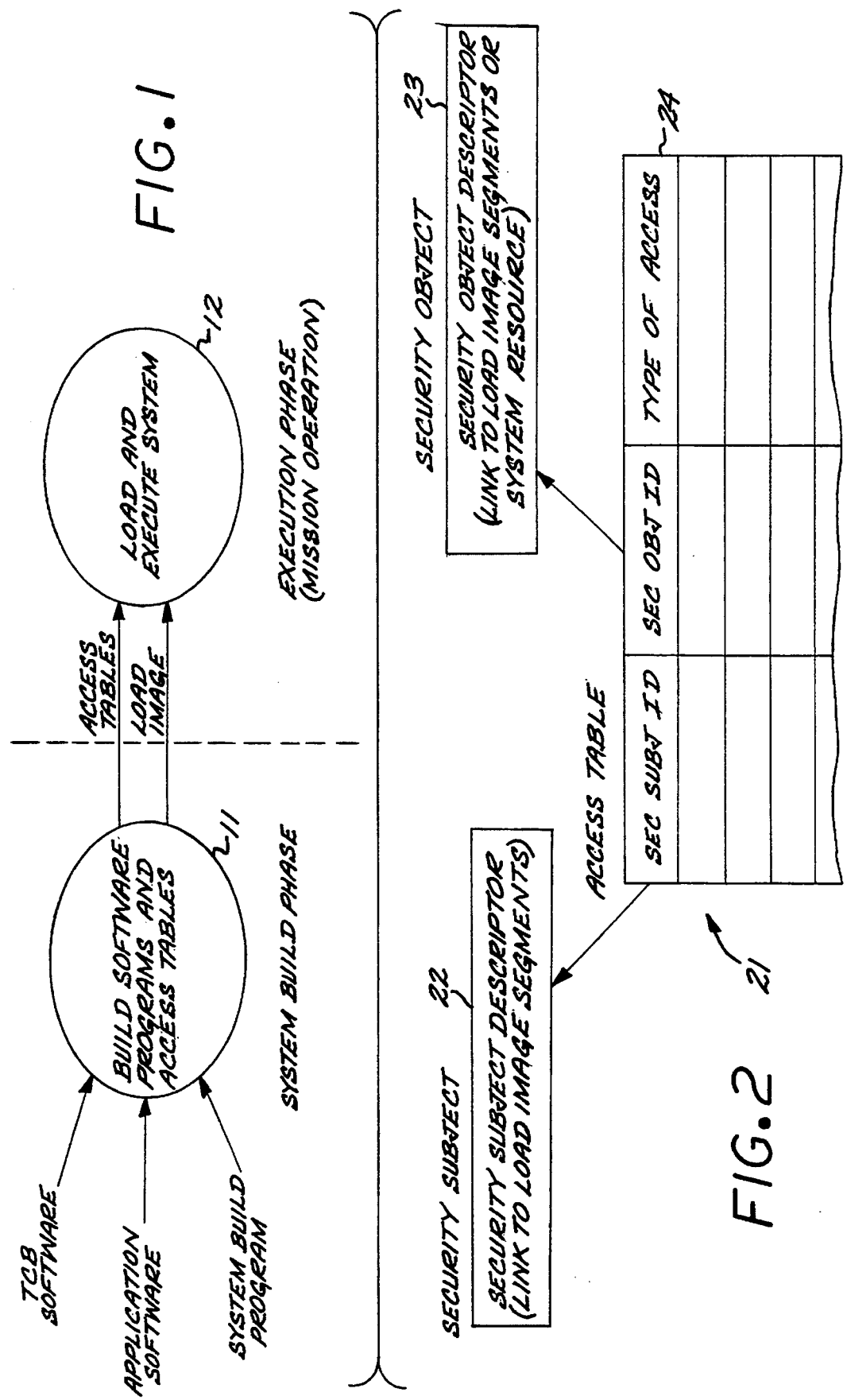

EFFICIENT SECURITY KERNEL FOR THE 80960 EXTENDED ARCHITECTURE

This is a continuation of application Ser. No. 07/934,281, filed Aug. 24, 1992, now abandoned, which is a continuation of application Ser. No. 07/727,674, filed Jul. 10, 1991 now abandoned.

BACKGROUND OF THE INVENTION

The subject invention is directed generally to computer security mechanisms, and more particularly to an efficient computer security mechanism.

There is a recognized need for security controls in computer systems which process sensitive and Department of Defense classified data. Historically "Computer Security" was achieved through "Periods Processing" and physical separation of computers, data and application programs. Research conducted over the last twenty years has lead to the design, implementation and evaluation of computer security mechanisms which can provide the necessary separation within the computer system. Today, the notion of "Computer Security" refers to the collection of techniques which properly implemented in a computer system provide for the separation of users, data, and application programs based on U.S. Department of Defense (DOD) defined security levels. The DOD security levels are based on security clearances granted by the government to individuals as a result of a DOD investigation and determination of an individual's "need to know."

Security controls within a computer system are aimed at preventing the disclosure of information to individuals not cleared for the information. This allows one computer system to be used by individuals who have been cleared for information at multiple levels of classification. Thus, through the implementation of proper controls a person possessing a "Confidential" security clearance and a person possessing a "Secret" security clearance may be able to use the same computer system.

The U.S. DOD has established standards for reviewing systems employing these techniques, and the standards are described in "Department of Defense Trusted Computer System Evaluation Criteria," DOD 5200 28.STD, December 1985, (referred to herein as TCSEC). The Criteria employ the concept of a "Trusted Computing Base" (TCB) which includes a combination of computer hardware and an operating system that supports untrusted applications and users. The Criteria identify seven levels of trust which range from systems that have minimal protection features to those that provide the highest level of security modern technology can produce. The Criteria was established as a means of defining objective guideline on which to base evaluations of both commercial systems and those developed for military applications. The National Computer Security Center was established in 1981 and given official responsibility for evaluating computer systems designed to meet one of the seven levels of trust for government use.

A fundamental computer security mechanism used to provide trust is a "Security Kernel" or "Reference Monitor." The use of such a mechanism was first described in "Computer Security Technology Planning Study," J. P. Anderson, ESD-TR-73-51, Vol. 1, AD-758 206, ESD/AFSC, Hanscom AFB, Bedford, Mass., October 1972. The security kernel approach is a method of building an operating system (the software that controls the execution of a computer) which is capable of enforcing DOD mandated controls on people's access to data. This approach has become to be accepted as one of the best techniques for providing computer security within a computing system.

In the reference entitled *Building a Secure Computer System*, M. Gassser, Van Nostrand Reinhold Company, New York, 1988, the security kernel is generally described as follows at pages 35–36:

> The security kernel approach to building a system is based on the concept of a reference monitor—a combination of hardware and software responsible for enforcing the security policy of the system. Access decisions specified by the policy are based on information in an abstract access control database. The access control database embodies the security state of the system and contains information such as security attributes and access rights. The database is dynamic, changing as subjects and objects are created or deleted, and as their rights are modified. A key requirement of the reference monitor is the control of each and every access from subject to object.

Security kernels usually consult their access control database in order to compare security labels associated with all subjects and objects in a computer system. The labels are compared based on a dominance relation which is defined by a formal security policy. The security policy defined in "Secure Computer Systems: Unified Exposition and Multics Interpretation," D. E. Bell and L. J. LaPadula, MTR-2997, The MITRE Corp. Bedford, Mass., March 1976, has been widely accepted as a mathematical model of DOD controls when implemented in a computer system. The model describes controls on the accesses of subjects to objects in a computer system.

The Bell and LaPadula secrecy policy imposes two rules, stated in terms of subjects and objects they are:

1. A subject may not read from an object of a higher secrecy class.

2. A subject may not write into an object of a lower secrecy class.

These rules, when properly enforced in a computer system, prevent unauthorized disclosure of information. The first rule prevents a subject from seeing information that it is not cleared for. The second rule prevents a subject from giving information that it is cleared for to another subject who is not cleared for it.

While security kernels dramatically improve the security of a computer system they do so at some performance cost. That is, consulting the access control database introduces extra computational steps for each operation. The performance degradation has generally been around 25%. That is, a trusted computer system with a security kernel is in general 25% slower than a comparable computer system without a security kernel. For many classified processing applications this degradation has been acceptable when compared with the damage to the national security from disclosure of the sensitive information. However, many applications require both computer security controls and high performance computer systems.

Several computer manufactures have introduced specialized architectures in order to achieve the high performance needed for many critical military applications. Among them is the Intel 80960 MX.

It is clearly desirable in implement a security kernel on such an architecture as there are many applications which require both security and high performance.

The type of architecture employed on the 80960 MX is known as a capability architecture wherein access control is based on capability lists. A capability is a key to a specific object, along with a mode of access; and a subject possessing a capability may access the object in the specified mode. Capability architectures, however, can present significant difficulties with respect to satisfying security requirements. In the paper "On the Inability of an Unmodified Capability Machine to Enforce the *-Property," W. E. Boebert, Proceedings of the Seventh DoD/NBS Computer Security Conference, Gaithersburg, Md., 1984, it has been demonstrated that a pure capability-based machine architecture cannot be sufficient to implement a mandatory access control policy. Furthermore, it has been found in practice that capability-based systems may be intrinsically incapable of implementing a mandatory access control policy if they permit capabilities to be stored arbitrarily and passed freely to other subjects.

Numerous capability-based computing systems (both commercial and prototypical) have been implemented in the past, and deficiencies have subsequently been reported about their ability to enforce a rigorously defined access control policy. In general, attempts to correct the identified flaws in these systems could not be gracefully integrated into their structure and protection philosophy.

This invention addresses the problems encountered when attempting to implement a security kernel on specialized high performance capability-based architecture such as the Intel 80960 MX.

SUMMARY OF THE INVENTION

It would therefore be an advantage to provide a computer security mechanism that avoids the time consuming computations of a dynamic access control database.

Another advantage would be to provide a computer security mechanism that avoids the time consuming consultations to an access control database for each and every access of a security object.

The foregoing and other advantages are provided by the invention in a computer security mechanism that includes an access control table specifying the predetermined access rights of each of a plurality of predetermined security subjects relative to predetermined security objects; a collection of mutually exclusive execution domains for each of the security subjects so that the executing processes of a security subject can only directly access code and data contained within the collection of domains of such security subject; a collection of mutually exclusive domains for a plurality of security object type managers, each of which is the sole owner of the right and ability to create and control access to security objects of a predetermined type, such that the only interaction between the execution environment of a security subject and the execution environment of another security subject is through operations on security objects performed through the services of the type managers; an object table for storing entries identifying the nature and location of security objects; and unforgeable access descriptors created by the security type managers by reference to the access control table for validation of access rights and utilized to allow access by security subjects to security objects, each access descriptor containing an index to the object table entry for the associated security object and identification of the access rights of the security subject with which the access descriptor is associated, whereby use of an access descriptor allows for efficient validation and mechanization of a requested access. More particularly, access to a security object is provided pursuant to a set up phase and a use phase. In the setup phase, access is validated by reference to the access control table, the object is created and/or allocated, and the access descriptor is created for use by accessing subject. In the use phase, access is validated by reference to access descriptor. By partitioning the validation/allocation function from the use function, the relatively large overhead of setup is incurred only once, and the use function, which can be utilized many times, can be very efficient.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a data flow diagram of the interface to system build.

FIG. 2 is a block diagram of an access table structure.

DETAILED DESCRIPTION OF THE DISCLOSURE

Figure 3A:
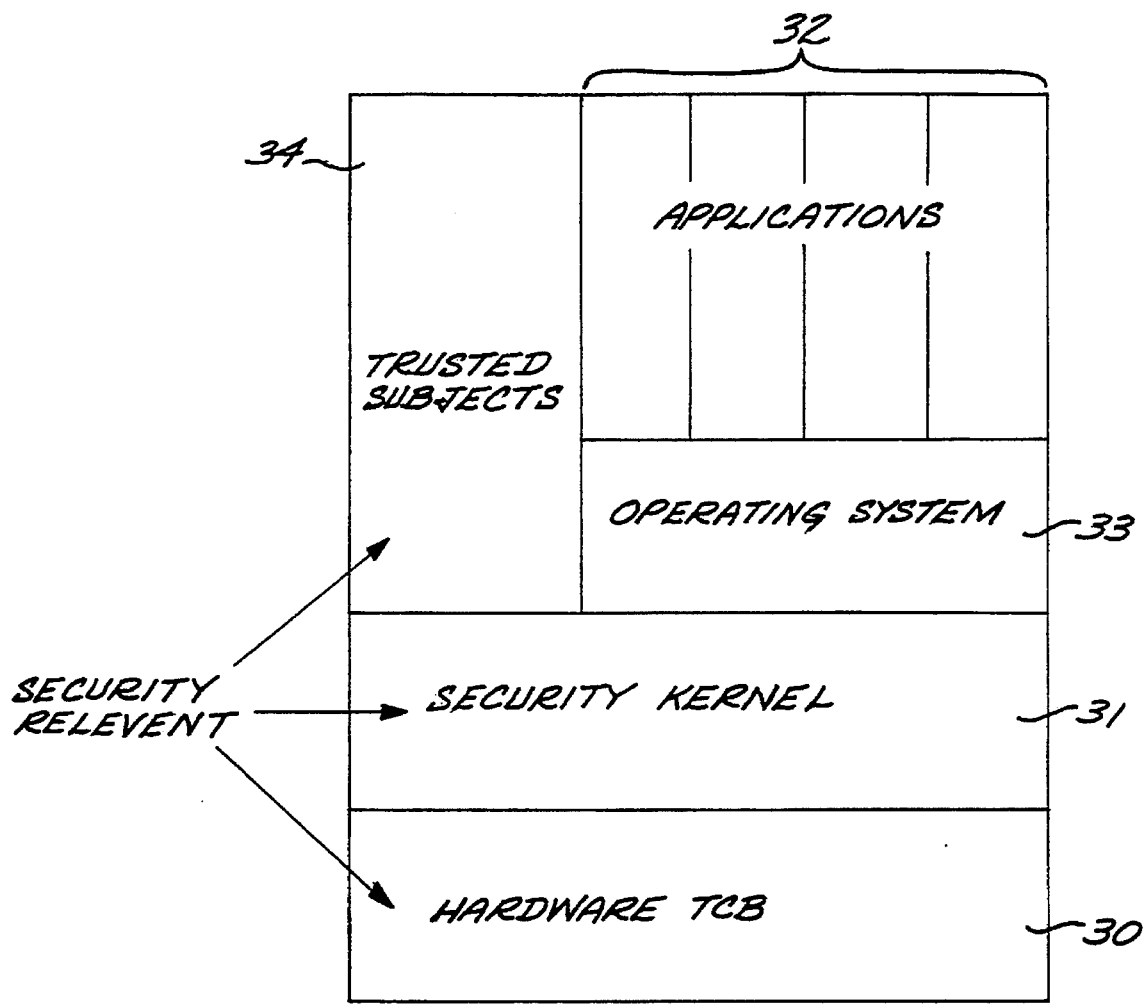
FIG. 3a and 3b are block diagrams of the components of an execution environment.

In the following detailed description and in the several figures of the drawing, like elements are identified with like reference numerals.

Basic Concepts and Definitions

The subject invention is based on a data processing environment shown in FIG. 1 that separates the definition of application programs and their associated access rights to processing objects, into a system build phase 11, distinct from the operational execution environment 12 in which they are instantiated and executed. The system build phase 11 assigns unique identifiers for security entities (subjects and objects) with the security level of each, identifies trusted subjects, defines the authorized type of access for each subject for objects and provides verification of compliance with the system security policy. A discussion of system build and its relation to the access control table is set forth in "The Role of 'System Build' in Trusted Embedded Systems," J. P. Alstad, C. M. Brophy, T. C. V. Benzel, M. M. Bernstein, and R. J. Feiertag, Proceeding of the 13th National Computer Security Conference, Washington, D.C., October 1990, incorporated herein by reference.

Schematically shown in FIG. 2 is an access control table 21 generated by the system build phase for security subjects 22 and security objects 23 which are identified in respective fields of the table. A security subject 22 as defined herein may include one or more application programs or instances of these programs. Security objects 23 may be specific data entities or resource containers (such as processors, memory segments, or labelled messages). The type of access 24 allowed on the security object 22 will be dependent on the object type. Simple examples would be send or receive operations on labelled messages, execution of a program segment, or reading or writing of a file. As described in the following, the simple pro-defined static access table 21 is used by the subject invention in the execution environment for the enforcement of security.

The subject invention recognizes the model of security subjects and objects defined in the prior art, and defines a framework of operation and a core architecture upon which secure, high performance computing systems including operating systems may be built. A discussion of the prior art model of security subjects and objects is set forth in the previously cited Gasser text at pages 26–29, incorporated herein by reference.

Security subjects 22, described in the prior art as the active entities of a computer system that cause information to flow among objects or change the system state, are embodied by the subject invention as the computing processes, or threads of execution of the application programs. Generally, a security subject 22 of the present invention is composed of one or more processes, associated with one or more application programs.

Security objects 23, described by the prior art as the passive entities that contain or receive information, are embodied by the subject invention in a general access model described in the following, which encompasses all of the logical objects of the computing system that the processes have access. Access as described herein, includes all operations of processes upon objects, including the execution of program code segments, loading or storing from data segments, signalling of semaphores, the sending of messages, as well as reading or writing I/O ports.

The present invention falls in the class of operating systems processing which form a part what is known as the trusted computing base (TCB) of a computing system. The Security Kernel provides the core portion of operating systems functionality necessary to be trusted to ensure secure operation of the computing system. Other components of the TCB exist, such as the system build tool and trusted subjects, but the Security Kernel forms the core of the operational environment, upon which operating systems may be built, and applications executed.

The objects, methods and functions described herein may be implemented in hardware, firmware, or software or any combination thereof. Shown in FIG. 3a is the operational context of a contemplated implementation of the invention 31 with regard to the execution phase components of the computing system. The bulk of the software involved in the execution environment is expected to be involved in the untrusted application programs 32 as well as the untrusted operating system 33 which depend on subject invention 31 to provide operation in accordance with the security policies of the computing system. Trusted subjects 34, though trusted to operate properly, also rely on the subject invention 31 for protection from outside interference, e.g., untrusted applications 32 or operating systems 33. Hardware 30 is relied upon by the subject invention 31 and is a part of the security relevant TCB.

Figure 3B:
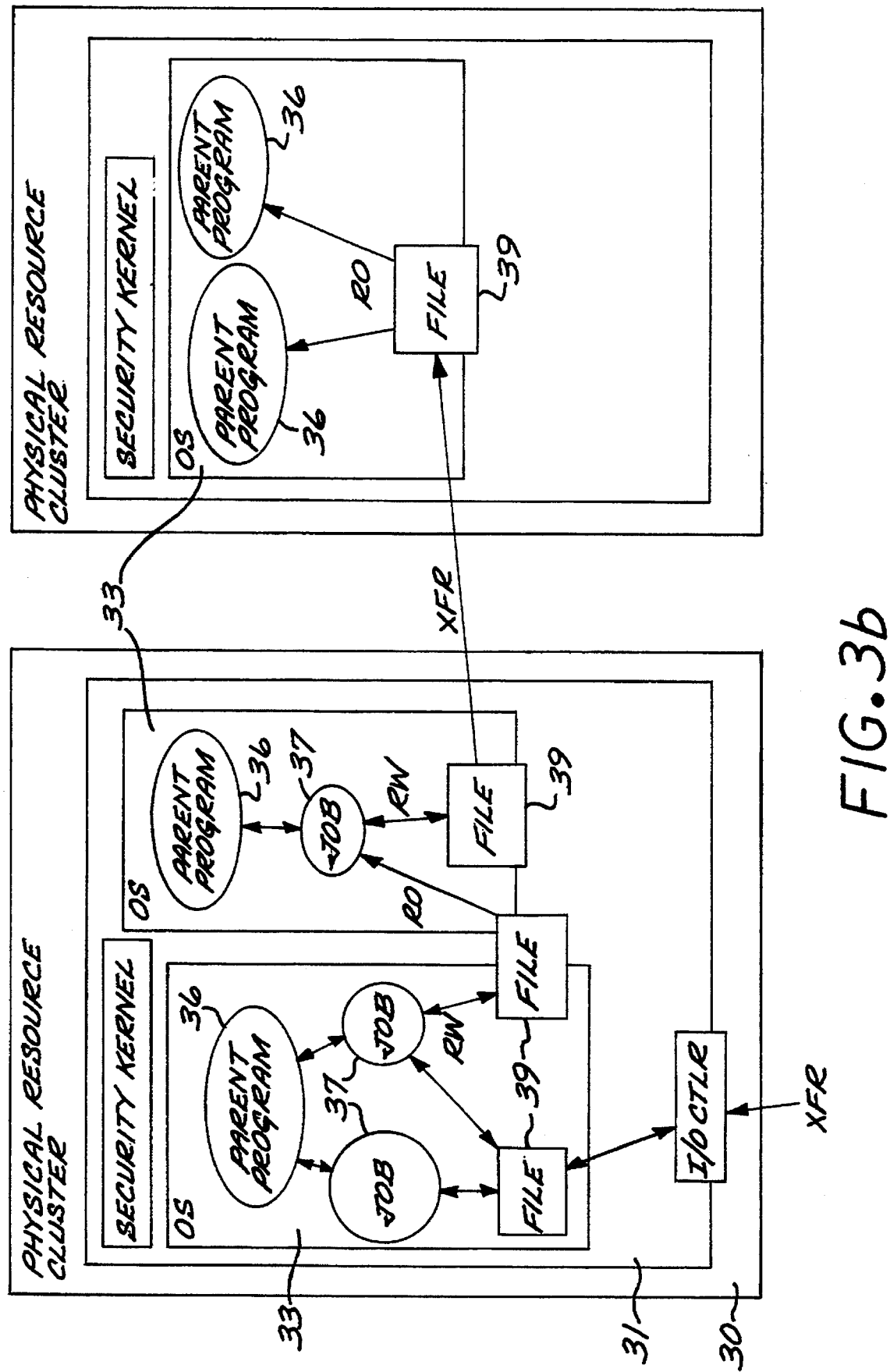

As described in the following, the subject invention provides for the isolation of security subjects and dedicated logical resources through a modified "virtual machine" approach. For most purposes described herein, the preferred embodiment is described in the context of a single processor computer system supporting a single operating system. However, as indicated in FIG. 3b, multiple operating systems 33 or instances of an operating system 32 can be supported through the definition of protected virtual machines which enclose an operating system 33 and the associated application programs 32 (which includes parent programs 36 as well as child jobs 37) for a single security subject. Only where the usage of logical resources of one security subject (i.e., virtual machine) either implicitly or explicitly affects those of another, is there a need for mediation by the TCB. Thus, a virtual machine approach is used to provide resource encapsulation with explicit I/O interactions between security subjects. Security objects, such as processor and memory resources or data collections such as filer 39, may be dedicated to a security subject's virtual machine, through the access control mechanisms of the Security Kernel, such that explicit mediation of access is provided primarily in setting up the resources for the subject's virtual machine rather than in mediating the usage of these resources. A virtual machine approach is not strictly followed, however, in that the systems software supporting this approach (i.e., the operating systems 33 of the virtual machines, and the Security Kernel 31 supporting the "virtual machines"), are explicitly aware of one another and operate in a complementary fashion to avoid duplicated functionality and performance degradation. For example, operating system software implemented upon the subject invention is fully aware of the services provided by the Security Kernel and is designed to call upon the Security Kernel to gain access to security objects, rather than attempt to manipulate them directly. Additionally, resources associated with a security subject may include multiple processors which may run jobs 37 of the security subject, and would be identified in the access table as authorized security objects.

Security relevant hardware components are also contemplated in an efficient implementation. The preferred embodiment described herein, without any intended limitation of the scope of the invention, makes use of the following basic mechanisms that for efficient performance are assumed to be implemented in the computing system hardware. The hardware provides a means to support address space separation of programs. The hardware provides a means to allow programs to share segments of code, but also prevents programs from writing into such segments. The hardware supports memory mapped I/O, wherein input and output operations are supported through the same addressing model as main memory. The hardware provides a comprehensive mechanism for controlling memory access and processor state.

Figure 4A:
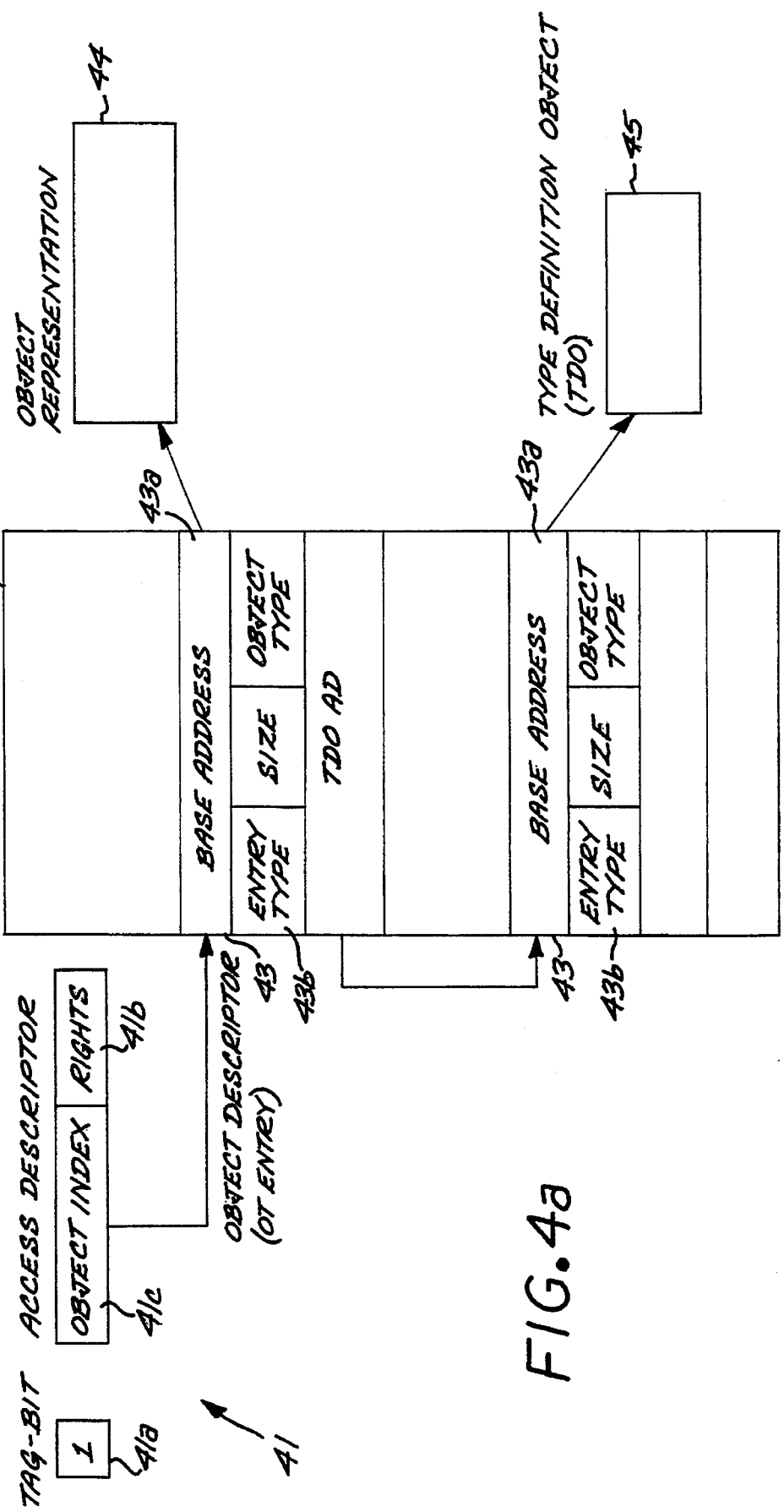
FIG. 4a is a block diagram of the structure of an object-based access control mechanism.
Figure 4B:
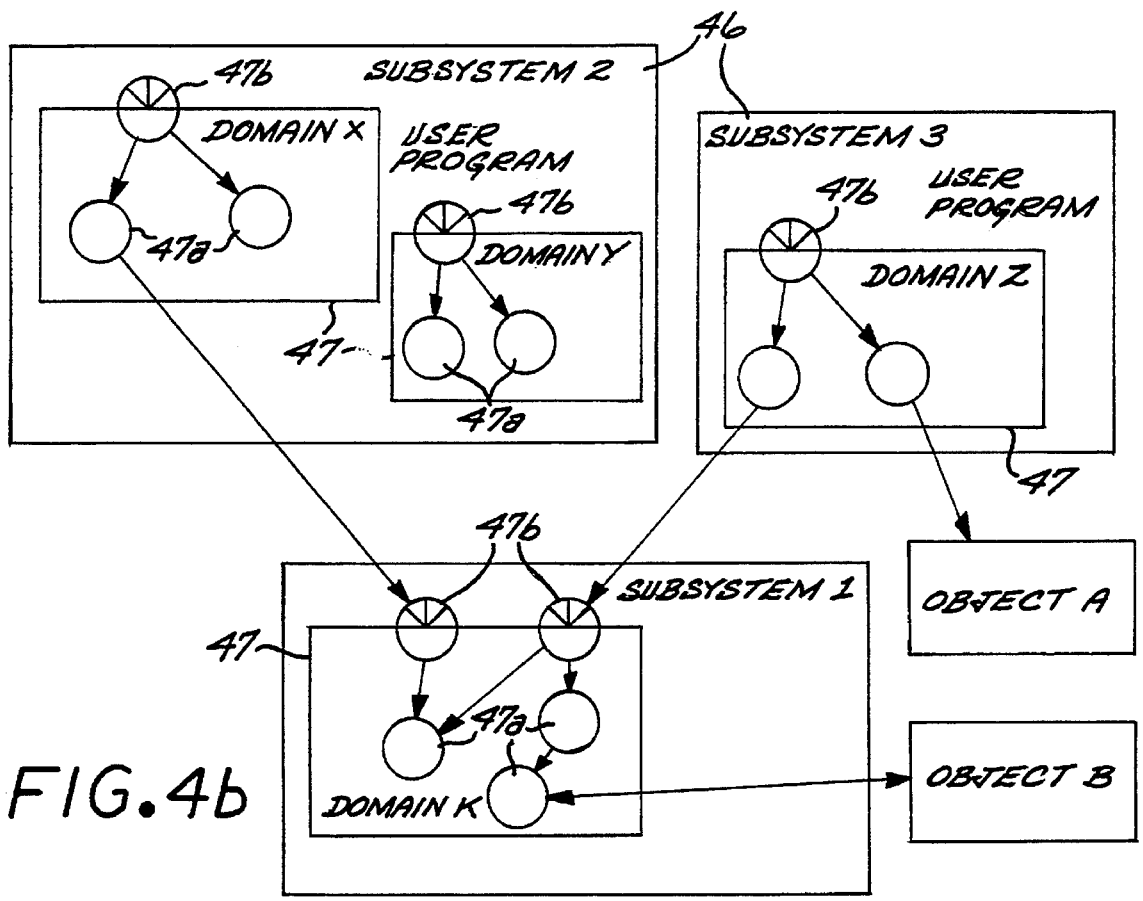
FIG. 4b and 4c are block diagrams of the relationship between program components and domain objects.
Figure 4C:
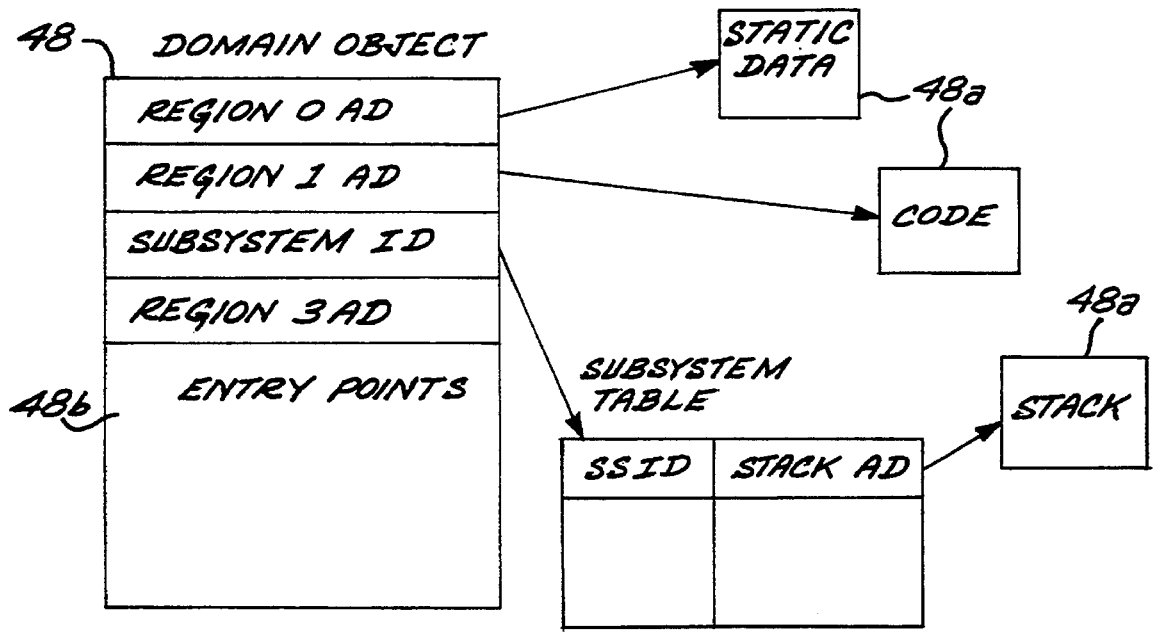

By way of illustrative example, the subject invention can be implemented in conjunction with the Intel 80960 MX processor. Based on the information contained in the document "i960™ Programmer's Reference Manual," Intel Corporation (1991), FIG. 4a shows the contemplated hardware implementation of a comprehensive mechanism for controlling memory access and processor state upon which this preferred embodiment is described. A hardware mechanization of object addressing and computing process protection is defined wherein fine grained memory segments implement objects which are accessed through an unforgeable access descriptor 41 (AD). In the cited implementation, an extra 33rd bit is used as a tag bit 41a to identify the word as an AD, which has access rights 41c specified and an index 41b to the object descriptor 43 in the object table 42. Each object descriptor 43 in the object table 42 allows for specification of the base address 43a of the object representation 44, as well as the type definition object 45 (TDO), The cited implementation includes the recognition of specific object types such as TDO's, processes and domains. Domains in particular, establish the accessible address space of the processes of an application program, for the program components such as code and data segments. Shown in FIG. 4b is the partitioning of the execution environment into protected sub-systems 46, each of which is composed of one or more domains 47. Domains 47 are composed of private program modules 47a, which are accessed through the public interfaces 47b defined for each domain, using the hardware implemented call domain mechanism. Shown in FIG. 4c is the domain object representation 48 that specifies the domain's attributes, including the domain specific address space 48a and entry points 48b. The above cited implementation of execution domains and access descriptors (AD) is believed to be the most efficient basis for the implementation of the subject invention, however, more conventional hardware utilizing privileged states may be used to provide equivalent functionality.

Processing Architecture

The current invention includes three distinct forms of processing: Initialization of the execution environment, security object Setup services and security object Use services. Initialization begins the operational phase of the computing system by establishing a secure initial processing state and initiating the execution of the Application Programs designated for initial startup. Setup processing and Use processing are then provided by the Security Kernel in response to service requests. Setup services of the present invention support the allocation and instantiation, as well as dis-instantiation and deallocation, of security objects for use by potentially untrusted programs, including the operating systems built upon the Security Kernel. Setup services include the execution time overhead of validating authorized access and the setup of mediation parameters, separately from the mediation of the iterative use of security objects. It is believed that this will be particularly useful with hardware implementation of the mediation of access control, though no limitation on the scope of the present invention is intended in the hardware, firmware or software implementation. Interrupt and fault handling comprise a fourth category of processing contained within the Security Kernel, but are not unique from prior art and can be accomplished by persons skilled in the art.

Initialization

The establishment of the secure execution environment is guaranteed through the initialization of the computing system by the Security Kernel. The first step in this process must be the identification of the specific hardware environment and the verification of the hardware integrity. While important as a first step, the specifics of this phase of processing will be peculiar to the implementation hardware and with the exception of specific security functions that may be mechanized in hardware, is not unique to the subject invention.

The next phase of the initialization processing establishes the Security Kernel itself as a protected subsystem and the sole owner of the right and ability to create new object types in the execution environment. The code and data segments of the Security Kernel software are loaded into memory areas that are setup and protected as distinct memory objects (region 0, 1, and 2; typically, region 2 is used as the stack object) associated with a domain object. A separate domain will typically be established for the collection of service routines associated with a particular type of security object, though simple systems may place all Security Kernel modules into the same domain of this protected subsystem.

The collection of services for a class of security objects forms a type manager which will define, for the domain 47 (FIG. 4b) in which it is contained, a predefined set of public entry points 47b (FIG. 4b) through which the services of that type manager may be invoked. The type manager routines of the Security Kernel are trusted routines which own non-forgeable access descriptors to TDO's 45 (FIG. 4a) which allow the routines to create and control access to the class of objects defined for the type manager. Examples of such object classes may be labelled messages, data file,and program images. Typically the security objects of the computing system are controlled by the Security Kernel type managers through the control and use of low-level objects of the hardware, such as memory pages, I/O controller registers, and processor state registers. As previously cited, the preferred embodiment of the present invention contemplates the use of a comprehensive hardware supported low-level object-based addressing and protection mechanism.

All objects, including TDO's 45 (FIG. 4a) and domain objects 48 (FIG. 4c), are tracked and controlled through the use of the system object, table, whose entries link the AD's of the system to their associated objects 44 (FIG. 4a) and type definition objects (TDOs) 45 (FIG. 4a). The establishment of the protected subsystem for the Security Kernel and the type manager domains is exclusively controlled by an AD 41 (FIG. 4a) for an object 44 (FIG. 4a) which controls the creation of new TDO's (as well as any other type of object), known as the super TDO. This AD for the super TDO is owned by the Security Kernel at the initialization of the execution environment and is never allowed to propagate out of the Security Kernel.

Once the Security Kernel itself has been established, the Security Kernel will establish untrusted protected subsystems 46 (FIG. 4b) for an initial set of one or more security subject's application programs. Domain objects 48 (FIG. 4c) for the load image modules of the application programs will be allocated as well as memory regions specified by the domain objects, and process and program objects. Each domain comprises an address space, which in the preferred embodiment is composed of memory regions for the code and data for a set of modules of the application program. An executing process of a security subject can thus only directly access the code and data of the domain it is currently using (executing in). Each security subject will be provided a collection of domains in subsystems protected from other security subjects. Subsystems shared between security subjects are trusted, such as the subsystems of the Security Kernel which must provide service access to security subjects. Operating systems layered on top of the Security Kernel to provide higher levels of services, typically will be established as separate instances for each security subject, to avoid the problems of verifying the software to be trustworthy.

Figure 5:
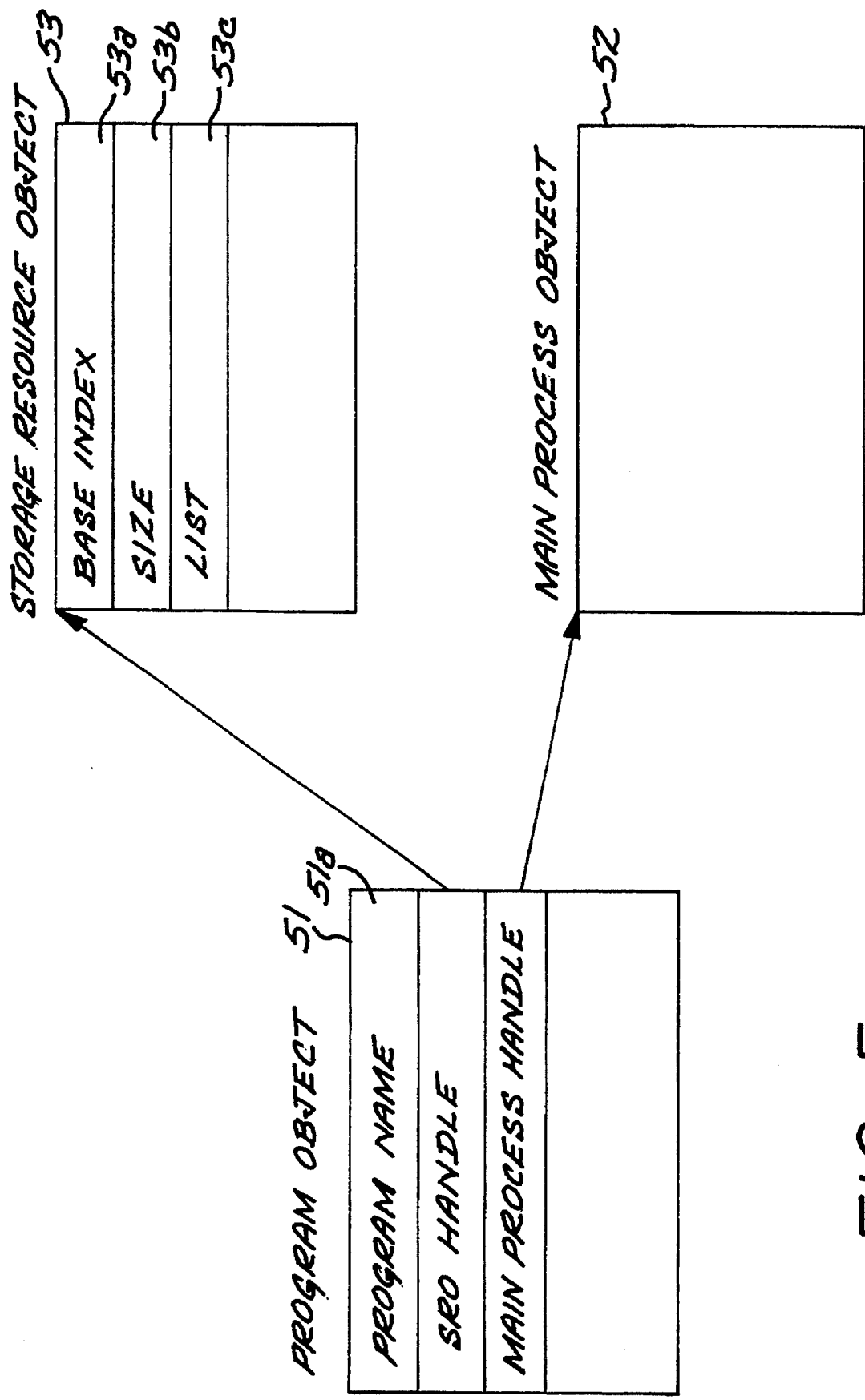
FIG. 5 is a block diagram of the structure of a program object and a storage resource object.

The separation of security subjects is also a consideration in the utilization of the object table entries. On the instantiation of a security subject in the execution environment, a segment of the system object table is reserved for the definition of object descriptors for objects owned by the security subject. Preferably, a logically contiguous section of the system object table is allocated for each application program of a security subject. Shown in FIG. 5 is a structure of a program object 51 which links together the basic objects of a program: the main process object 52 for the initial program process and the storage resource object 53 (SRO) used to manage the reserved segment of the object table. An SRO is used the Security Kernel to record the base index 53a of the reserved section, the size 53b of the reserved section, and the list 53c of unused entries in this section. Reuse of object table entries is allowed only for the definition of the objects owned by a security subject. System-wide objects, objects which cannot be dedicated to a particular security subject, are not typically allowed to reuse object table entries for performance reasons (though garbage collection schemes well known to persons skilled in the art may be applied if the implementation's performance needs allow for such schemes). The collection of objects set up by the Security Kernel and dedicated to (i.e., exclusive to) a particular security subject establishes a virtual machine (a distinct execution environment) whose usage may be coordinated by an operating system for the security subject. Once established, the only interaction between each security subject's execution environment with another is through operations on security objects performed through services of the Security Kernel.

Setup Services

The preceding description of setting up the initial set of security subjects to execute application programs is one example of a general form of services to setup a security object for access by a security subject (in this case the setup of a program image for execution access by the security subject). Generally each security object type manager of the subject invention provides setup services for objects of its supported type, to get resources and establish access (e.g., Load and run program, Open file establishing I/O access, Connect message port, etc.), as well as to terminate access and release resources In the former case, these type manger setup services must check for pre-authorized access to the specified security object in the access control table 21 (FIG. 2), check SRO free list 53c (FIG. 5) for available object table entries for the underlying low-level objects, allocate and initialize the object table entries to this security object, allocate memory space and setup any associated page table entries for the low-level object representations 44 (FIG. 4a), initialize the object representations 44 (FIG. 4a) (including any hardware specific limits or access parameters in memory mapped I/O based objects, such as I/O controllers), setup an AD 41 (FIG. 4a) to reflect pre-authorized rights of the security subject for the security object (this may be reflected in the combination of the security object AD and low-level object AD's), and return the security object AD 41 (FIG. 4a) to the requestor for subsequent access. In the latter case of terminating access and releasing resources, the requestor's AD 41 (FIG. 4a) will be checked to verify that it is valid (i.e., that the tag bit 41a is set), the access table is checked to verify that the requesting security subject is authorized for the operation, the resources associated with the security object are checked to verify that they are in a safe state of operation, the security object descriptor 43 (FIG. 4a) in the object table is marked invalid in the entry type field 43b, the object descriptor entry 43 (FIG. 4a) is added to the SRO free list 53c (FIG. 5 if reuse is allowed, and the resources associated with the security object are released. As to the release of resources, memory resources must be securely erased to allow release, which also invalidates any ADs contained in the released memory.

An example of a Type Manager is a Semaphore Type Manager which manages a semaphore security object. Some of the functions that can be performed on a semaphore object are Creating and Deleting a Semaphore object and Signaling and Waiting for the Semaphore. In this example, the services to Create & Destroy semaphores are setup services which involve the checking of access control table as to the validity of access to the semaphore object and setting up the access. On the other hand, the Signal & Wait on semaphore services are use services which utilize the underlying object-based access control mechanisms of the access descriptor. The idea is to have the overhead of security subject to security object access validation in the Create & Destroy services and have the Signal & Wait uses be very efficient.

Figure 6:
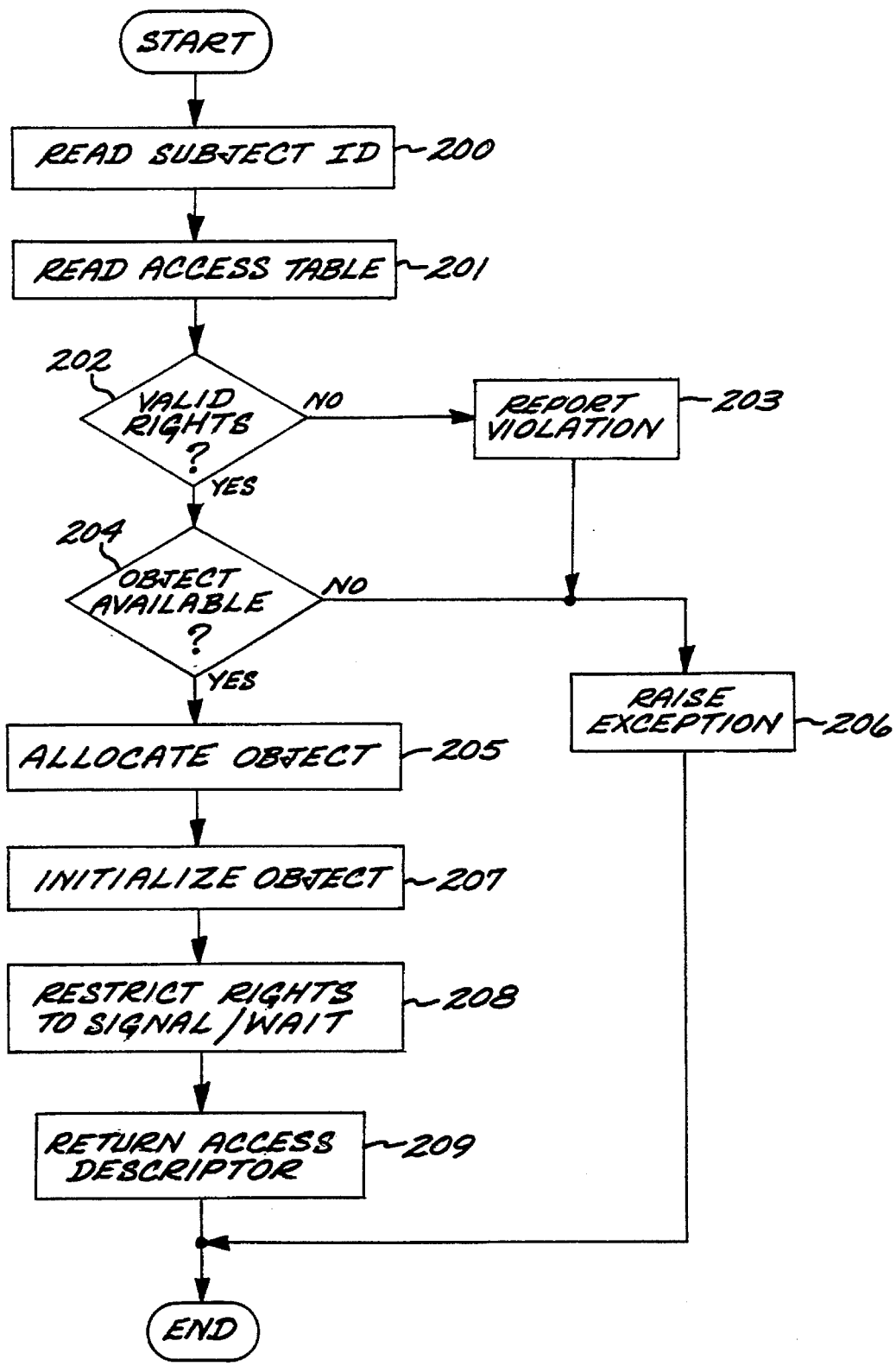
FIG. 6 is a flow chart demonstrating a "create semaphore" setup service.

FIG. 6 sets forth a flow diagram of a procedure for creating a semaphore object. The input to this service is an initial count for the semaphore. At 200 the security subject identification associated with the calling process is determined. A 201 the access table is checked to the access rights of this security subject. At 202 a determination is made as to whether the security subject has valid rights to create a semaphore object. If no, at 203 a security violation attempt is reported, and at 206 an exception is raised to notify the caller that there is a problem. If the determination at 202 is yes, the security subject has valid rights to create a semaphore object, at 204 the SRO free list is checked for an available Object Table Entry (OTE). If no, an OTE is not available, control transfers to 206 to raise an exception to notify the caller that there is a problem. If an OTE is available, at 205 the OTE and the Object space at allocated. At 207 the object is initialized to define the object type and the initial count for the semaphore. At 208 an AD is created with rights restricting the user to only those type manager supported services that the requesting subject is authorized for (e.g., only signal and/or wait on the semaphore). At 209 the AD is returned to the user 209. The returned AD can be used by the user to request authorized operations on the semaphore object.

Figure 7:
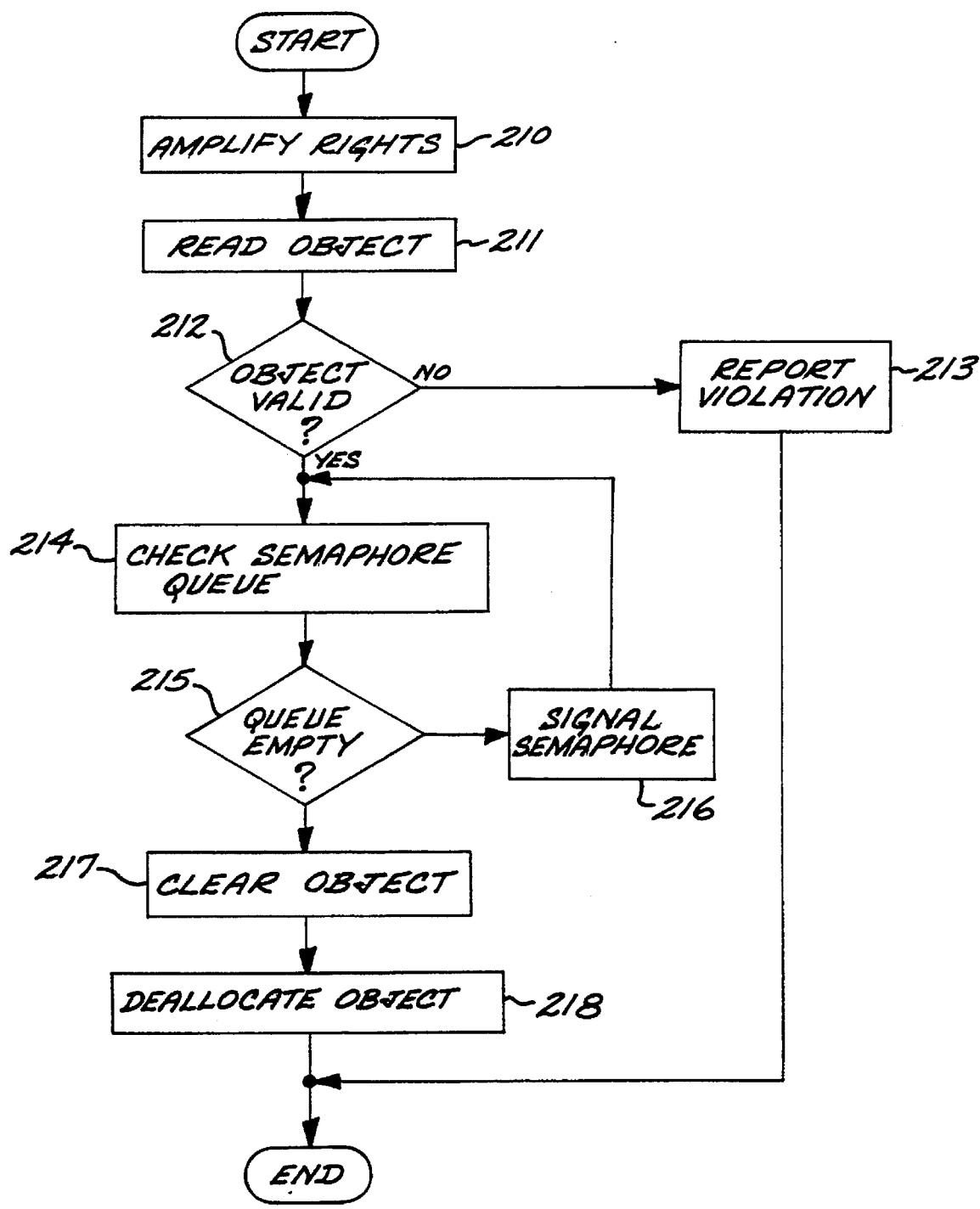
FIG. 7 is a flow chart demonstrating a "destroy semaphore" setup service.
Figure 8:
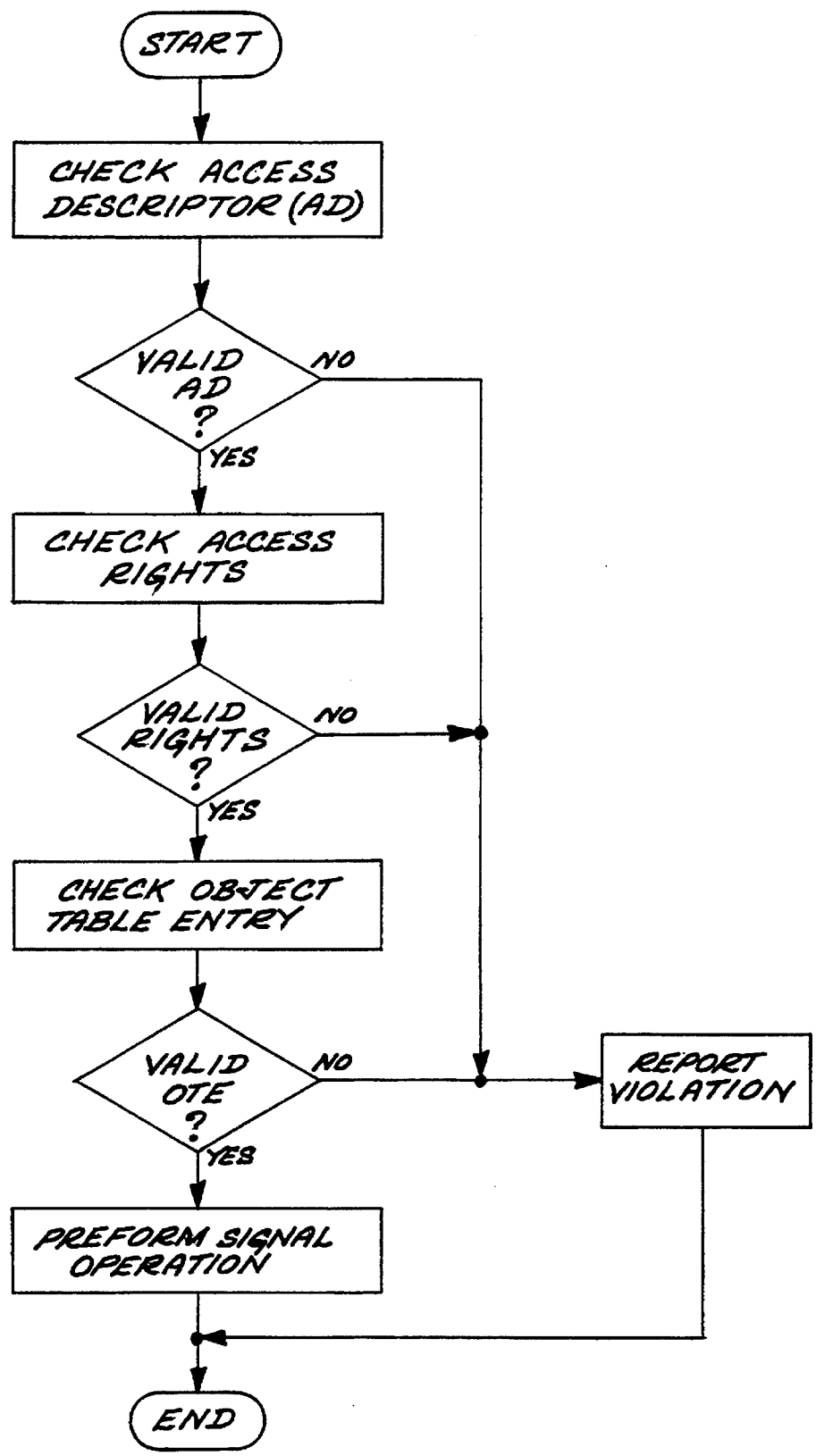
FIG. 8 is a flow chart demonstrating a "signal semaphore" use service.

FIG. 7 shows the processing necessary to destroy a semaphore object. The input to this service is an AD. At 210 the rights on the object are modified to allow deletion, and at 211 the object is read. At 212 a determination is made as to whether the AD refers to a valid object. If no, at 213 an attempted security violation is logged and reported. If determination at 212 is that the object is valid, at 213 the semaphore queue 214 is checked for any waiting processes. At 215 a determination is made as to whether the semaphore queue indicates any waiting processes. If yes, at 216 the semaphore is signalled for each waiting until the semaphore queue is empty. Once the Semaphore Queue is empty, then the object can be marked as no longer valid at 217, and at 218 the object is deallocated. If another AD exists for this semaphore and is used, the user will be faulted and an invalid object will be indicated.

Use Services

Once security objects have been instantiated and setup for a security subject, the security object type manager must then mediate use of previously setup object in use services such as: Spawn process, Read file, Send message, etc. In the contemplated implementation using the Intel 80960, many of these operations may be performed by hardware as directly requested by untrusted software, operating system or application, using trusted hardware setup by the Security Kernel software. Operations to be performed include: check if the requestor is using a valid AD (i.e., the tag bit is set); check if the associated object table entry is valid; check if AD rights and type rights and any associated memory page rights are proper for the requested use of the security object and underlying low-level objects; perform the requested operation on the security object.

Referring now to FIG. 9, set forth therein is a processing flow of a signal semaphore service. The input into this service is an AD for a semaphore to be destroyed. The AD is first examined at 220. A determination is made at 221 as to whether the AD is valid (i.e., whether the Tag bit is set). If valid, at 222 the AD rights are examined to determine if the signal operation is valid. If the operation is valid, at 224 the OTE is examined. At 225 a determination is made as to whether the entry is valid. If the OTE is valid, at 226 the signal operation is performed on the requested semaphore object. If any of the prior checks 221, 223, 225 fail, then an attempted security violation is logged and reported.

The foregoing has been a disclosure of an efficient computer security mechanism that provides for separation between the execution domains of security subjects, and efficient access to security objects by partitioning the validation/allocation function fron the use function.

Although the foregoing has been a description and illustration of specific embodiments of the invention, various modifications and changes thereto can be made by persons skilled in the art without departing from the scope and spirit of the invention as defined by the following claims.

What is claimed is:

1. A security kernel for a computer system having resources organized into objects, the security kernel comprising:

electrical storage means for electrically storing in electrical form an access control table that sets forth access rights of a plurality of predetermined programs relative to predetermined objects;

electrical storage means for electrically storing in electrical form an object table;

electrical processor means responsive to a computer program requesting setup for access to a requested one of the predetermined objects for checking the access control table for access rights of the requesting program, said processor means performing the following if the requesting program has the appropriate access rights: (a) producing an entry in the object table for the requested object, said entry identifying the nature and location of the requested object, (b) generating an access descriptor containing (1) the location of the object table entry for the requested object and (2) an identification of the access rights of the requesting program as to the requested object as to which access is appropriate, and (c) making the access descriptor available to the requesting program such that the requesting program possess the access descriptor;

said processing means further utilizing access descriptors to check validity of access by a requesting program to a predetermined object for which the requesting program possess an access descriptor.

2. A computer system for executing a computer program, comprising:

an electrically represented access control table that sets forth the access rights of the program relative to predetermined security objects;

an electrically represented object table that identifies predetermined security objects that the program can be validly accessed by the program;

electrical processing means for providing to the program an access descriptor for each object table entry, each access descriptor containing a pointer to the associated security object table entry and an identification of the access rights of the program as to the associated object table entry, and for checking the validity of access by the program to one of the predetermined objects by checking the access descriptors of the program.

* * * * *